UNITED STATES PATENT OFFICE.

O. F. GREEN AND JAMES E. CLARK, OF ST. LOUIS, MISSOURI.

IMPROVEMENT IN THE MANUFACTURE OF SMALL BEER.

Specification forming part of Letters Patent No. 82,401, dated September 22, 1868.

*To all whom it may concern:*

Be it known that we, O. F. GREEN and J. E. CLARK, of the city of St. Louis, in the county of St. Louis and State of Missouri, have made certain new and useful Improvements in Processes for Making Small Beer; and we do hereby declare that the following is a full and clear description thereof.

This invention relates to making that species of effervescent drinkable liquids in which no malt is used, usually called "small beer."

The nature of this invention is in the use of such ingredients as shall fully cause all necessary fermentative action without the application of brewers' yeast. It is well known that the processes of brewing are subject to many contingencies of failure by the unreliable action of yeast, and that this is especially true in warm temperatures. Again, the usual liquids called "small beer," made by the usual ingredients and yeast, are in no wise permanent liquids. They turn sour by acetification, and generally a short exposure to heat causes uncontrollable fermentation, and a total loss of the liquid as a beverage. In order, therefore, to form a more permanent beverage, we have used such ingredients to form our said liquid as shall be reliable and controllable in fermentative action, and produce a healthy and exhilarating drink.

To enable those skilled herein to make and use our said invention, we will now fully describe the same in its ingredients and manufacture.

We take, say, forty (40) gallons of clear, healthy water, preferring spring-water, such as is usually called "hard" from its holding in solution earthy salts. In said quantity of water we dissolve forty (40) pounds avoirdupois of merchantable refined sugar, agitating the water to aid the solution. Thereupon we add one (1) pound avoirdupois of merchantable tartaric or citric acid, and one (1) gallon of cider-sirup. Said cider-sirup is obtained by boiling down or evaporating down so as to form one (1) barrel of sirup out of three and a half (3½) to four (4) barrels of merchantable cider of apples. To the foregoing we add, by way of coloring said solution, one (1) pint of burnt sugar or caramel. Said solution is made at the ordinary cold temperature of the water, and to aid the process the fluid is kept in agitation by stirring. When said solution has thus been formed, we permit it to settle for ten (10) to twenty (20) hours, and then draw off the clear liquid (from the sediment) into casks or bottles. With a temperature of eighty (80) to eighty-five (85) degrees of Fahrenheit, it takes three (3) to four (4) days to produce the effervescent beverage, and it is then fit for immediate use as a beverage.

It is known that ordinary simple solutions of saccharine matter, such as common sugar in water, soon become pulpy and thick, and that to incite the fermentation yeast is added. Instead of the latter we have added the fruit acids, such as tartaric or citric acid, and the cider-sirup, thereby preventing the pulp transformation of the saccharine matter, and causing the fermentative generation of carbonic acid; but it is our experience that the generation of carbonic acid by our said process is reliable and fully controllable, thereby relieving our said process of the many disastrous contingencies of yeast-brewing. Moreover, the beverage so formed ferments mildly, so that the same has a greater permanency in warm temperatures than ordinary similar fermented liquids.

Having thus fully described our invention, what we claim is—

1. The ingredients hereinbefore mentioned, or their substantial equivalents, when subjected to the processes substantially as described.

2. The beverage formed from said ingredients, as a new article of manufacture, substantially as set forth.

In witness whereof we have hereto set our hands this 5th day of June, A. D. 1868.

O. F. GREEN.
JAMES E. CLARK.

Witnesses:
M. RANDOLPH,
GEO. P. HERTHEL, Jr.